(12) United States Patent
Vaccaro

(10) Patent No.: US 9,853,434 B2
(45) Date of Patent: Dec. 26, 2017

(54) HANGER FOR MOUNTING MULTIPLE CABLES

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/081,240

(22) Filed: Mar. 25, 2016

(65) Prior Publication Data

US 2016/0281883 A1 Sep. 29, 2016

Related U.S. Application Data

(60) Provisional application No. 62/139,205, filed on Mar. 27, 2015.

(51) Int. Cl.
*F16L 3/24* (2006.01)
*H02G 3/32* (2006.01)
*F16B 1/00* (2006.01)

(52) U.S. Cl.
CPC *H02G 3/32* (2013.01); *F16B 1/00* (2013.01)

(58) Field of Classification Search
CPC ....... F16L 3/24; F16L 3/13; F16L 3/04; F16L 3/223; F16L 55/035; F16L 3/127; F16L 3/237; F16L 3/22; F16L 3/2235; F16L 3/12; F16L 3/00; F16L 3/233; F16L 3/1075; F16L 3/221; F16L 3/02; F16L 3/137; H02G 3/32; H02G 3/30; H02G 3/26; H02G 3/263; H02G 3/0608; H02G 3/0456; H02G 11/00; H02G 3/22; H02G 3/0437; H02G 3/0443; H02G 3/0418; H02G 3/045; H02G 3/0487; H02G 7/20; H02G 11/006
USPC .......... 248/49, 62, 63, 65, 68.1, 73
See application file for complete search history.

(56) References Cited

U.S. PATENT DOCUMENTS

| | | | | |
|---|---|---|---|---|
| 5,669,590 | A * | 9/1997 | Przewodek | F16L 3/221 248/68.1 |
| 6,354,543 | B1 * | 3/2002 | Paske | H01P 1/00 211/85.18 |
| 6,899,304 | B2 * | 5/2005 | Bellmore | F16L 3/1203 24/485 |
| 7,484,698 | B2 * | 2/2009 | Budagher | F16L 3/11 174/40 R |
| 8,191,836 | B2 | 6/2012 | Korczak | |

(Continued)

*Primary Examiner* — Steven Marsh
(74) *Attorney, Agent, or Firm* — Myers Bigel, P.A.

(57) ABSTRACT

A cable hanger includes: a base with a front wall having locking projections and a rear wall having an opening; a pair of arcuate front arms mounted to front locations on the base, the front arms extending laterally from opposite sides of the base and having first locking features; and a pair of arcuate rear arms mounted to rear locations on the base, the rear arms extending laterally from opposite sides of the base and having second locking features. The front and rear arms on one side of the base are mounted in back-to-back relationship, and the front and rear arms on the opposite side of the base are mounted such that they are in back-to-back relationship. The locking projections of the base are insertable into the opening. The first locking features of the front arms are interlockable with the second locking features of the rear arms.

4 Claims, 3 Drawing Sheets

(56) References Cited

U.S. PATENT DOCUMENTS

| | | | |
|---|---|---|---|
| 8,353,485 B2 * | 1/2013 | Hjerpe | F16L 3/222 |
| | | | 211/182 |
| 8,439,316 B2 * | 5/2013 | Feige | F16L 3/13 |
| | | | 248/71 |
| 2002/0005463 A1 * | 1/2002 | Paske | F16L 3/12 |
| | | | 248/74.1 |

* cited by examiner

HANGER FOR MOUNTING MULTIPLE CABLES

RELATED APPLICATION

The present application claims priority from and the benefit of U.S. Provisional Patent Application No. 62/139,205, filed Mar. 27, 2015, the disclosure of which is hereby incorporated herein in its entirety.

FIELD OF THE INVENTION invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated by reference herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

FIGS. 1 and 2 show one variety of cable hanger of this type. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the locking projections 7 of another hanger 10 to mount a second cable.

As can be best seen in FIG. 2, the arms 5 include arcuate sections 14 that together generally define a circle within which a cable can be grasped. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

SUMMARY

As a first aspect, embodiments of the invention are directed to an assembly suitable for hanging two cables. The assembly comprises first and second cable hangers. Each of the first and second cable hangers comprises: a base with a front wall having locking projections and a rear wall having an opening; a pair of arcuate front arms mounted to front locations on the base, the front arms extending laterally from opposite sides of the base; and a pair of arcuate rear arms mounted to rear locations on the base, the rear arms extending laterally from opposite sides of the base. The locking projections of the second cable hanger are inserted into the opening of the first cable hanger. A space configured to capture a cable is formed by each pair of second hanger front arms and first hanger rear arms.

As a second aspect, embodiments of the invention are directed to a cable hanger used to mount cables to a mounting structure, comprising: a base with a front wall having locking projections and a rear wall having an opening; a pair of arcuate front arms mounted to front locations on the base, the front arms extending laterally from opposite sides of the base and having first locking features; and a pair of arcuate rear arms mounted to rear locations on the base, the rear arms extending laterally from opposite sides of the base and having second locking features. The front and rear arms on one side of the base are mounted such that they are in back-to-back relationship, and wherein the front and rear arms on the opposite side of the base are mounted such that they are in back-to-back relationship. The locking projections of the base are configured to be insertable into the opening. The first locking features of the front arms are configured to be interlockable with the second locking features of the rear arms.

As a third aspect, embodiments of the invention are directed to a method of mounting two communications cables to a mounting structure. The method comprises the steps of: (a) providing first and second cable hangers, each of the first and second cable hangers comprising: a base with a front wall having locking projections and a rear wall having an opening; a pair of arcuate front arms mounted to front locations on the base, the front arms extending laterally from opposite sides of the base; and a pair of arcuate rear arms mounted to rear locations on the base, the rear arms extending laterally from opposite sides of the base; (b) inserting the locking projections of the first cable hanger into mounting holes of a mounting structure; (c) positioning first and second cables adjacent the rear arms of the first cable hanger; and (d) inserting the locking projections of the second cable hanger into the opening of the base of the first cable hanger to capture the first and second cables.

DETAILED DESCRIPTION

Figure 1:
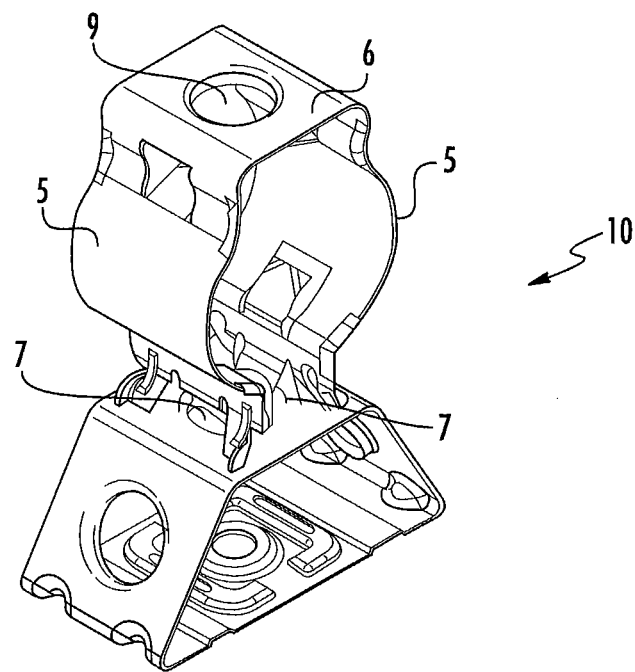
FIG. 1 is a perspective view of a prior cable hanger.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the drawings, a dual cable hanger, designated broadly at 110, is illustrated therein. The cable hanger 110 includes a base 112 that is hollow and generally rectangular in cross-section, with side walls 114, 116, two front half-walls 118a, 118b, and a rear wall 120, although other shapes for the base 112 may be employed. Each of the front half-walls 118a, 118b has a locking projection 122 with a hook 124 for mounting the cable hanger 110 to a structure 170, such as an antenna tower or the like, that includes a mounting hole 172 (see FIG. 6). The rear wall 120 has a mounting hole 126 that is sized to receive the locking projections 122 of a second cable hanger 110.

Figure 3:
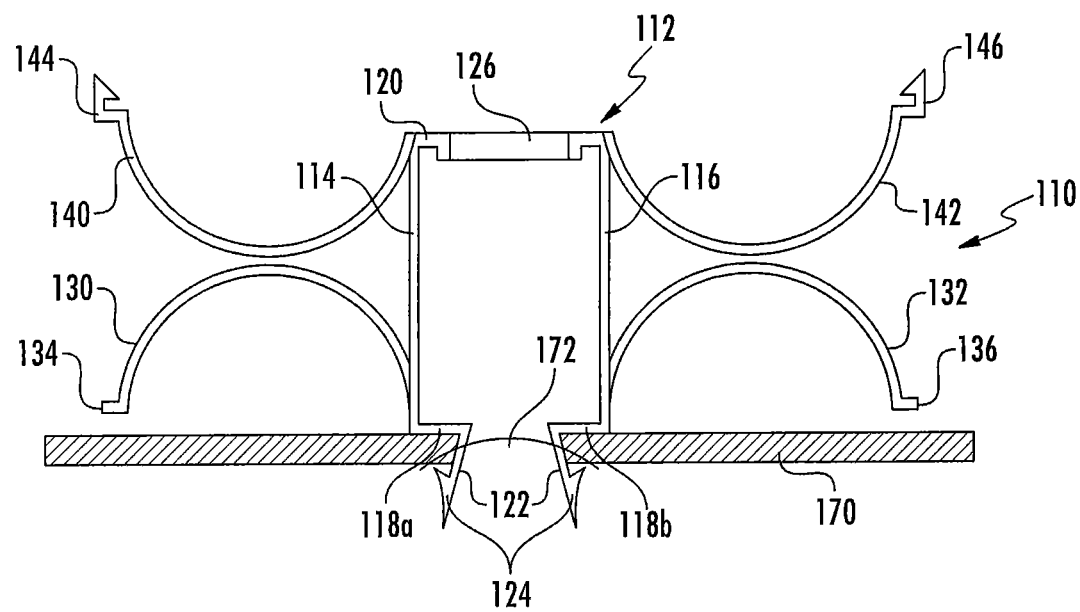
FIG. 3 is a top view of a dual cable hanger according to embodiments of the invention.

The cable hanger 110 also includes two arcuate front arms 130, 132 and two arcuate rear arms 140, 142. The front arms 130, 132 are attached near the shared edges of the front half-walls 118a, 118b and the side walls 114, 116. Each of the front arms 130, 132 is generally semicircular in profile. Similarly, each of the rear arms 140, 142 is attached near the shared edges of the rear and side walls 120, 114, 116 and is generally semicircular in profile. As can be seen in FIG. 3, each of the front arms 130, 132 has a central portion that extends rearwardly, and each of the rear arms has a central portion that extends forwardly, such that each pair of front and rear arms 130, 140, 132, 142 has a "back-to-back" relationship, with the "open" ends of space defined by pairs of front and rear arms facing in opposite directions.

Each of the front arms 130, 132 includes a respective tab 134, 136 that extends from the end of the arm away from the base 102. Each of the rear arms 140, 142 includes a respective hook 144, 146 that extends rearwardly from the end of the arm. The hooks 144, 146 are configured to engage and lock with the tabs 134, 136.

Figure 6:
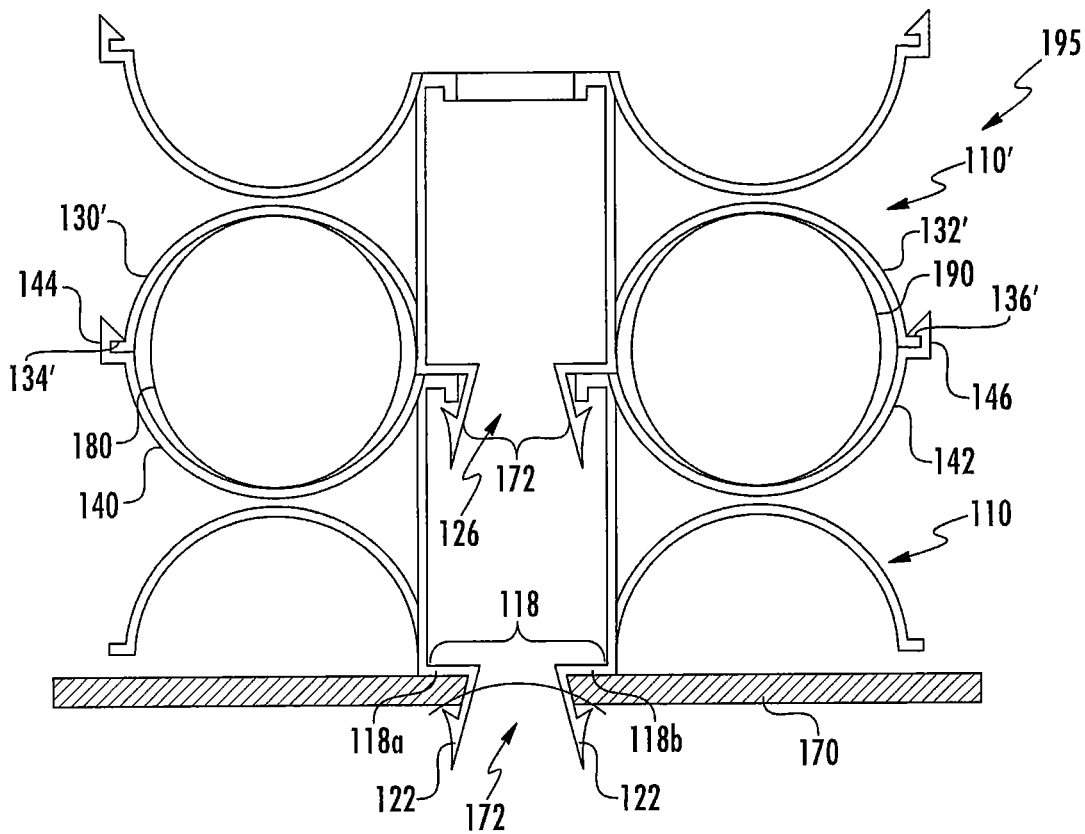
FIG. 6 is a top view of two cable hangers of FIG. 3 interlocked to capture two cables.

As can be seen in FIG. 6, a pair of cable hangers 110, 110' can be used to hang two cables 180, 190. A first cable hanger 110 is mounted in the mounting structure 170 by inserting the locking projections 122 into the mounting hole 172, with the front half-walls 118a, 118b adjacent the mounting structure 170 to form a discontinuous front wall 118. The cables 180, 190 can then be positioned within the spaces defined by the rear arms 140, 142. A second cable hanger 110' can then be mounted to the first cable hanger 110 by inserting its locking projections 172' into the mounting hole 126 of the first cable hanger 110. The cable 180 can be secured by inserting the tab 134' of the front arm 130' of the second cable hanger 110' into the hook 144 of the rear arm 140 of the first cable hanger 110. Likewise, the cable 190 can be secured by inserting the tab 136' of the front arm 132' of the second cable hanger 110' into the hook 146 of the rear arm 142 of the first cable hanger 110. The resulting assembly 195 of the first and second cable hangers 110, 110' can thus mount two cables 180, 190 at once.

Those of skill in this art will recognize that pairs of cables can be mounted in a "stacked" arrangement by simply continuing to add cable hangers 110 to the assembly, in each instance employing the locking projections 122 to mount the next cable hanger 110 in the mounting hole 126 of the previous cable hanger 110 and mating the front arms 130, 132 of the next cable hanger 110 with the rear arms 140, 142 of the previous cable hanger 110. The mounting of each subsequent cable hanger provides the capability of mounting two additional cables.

Figure 4:
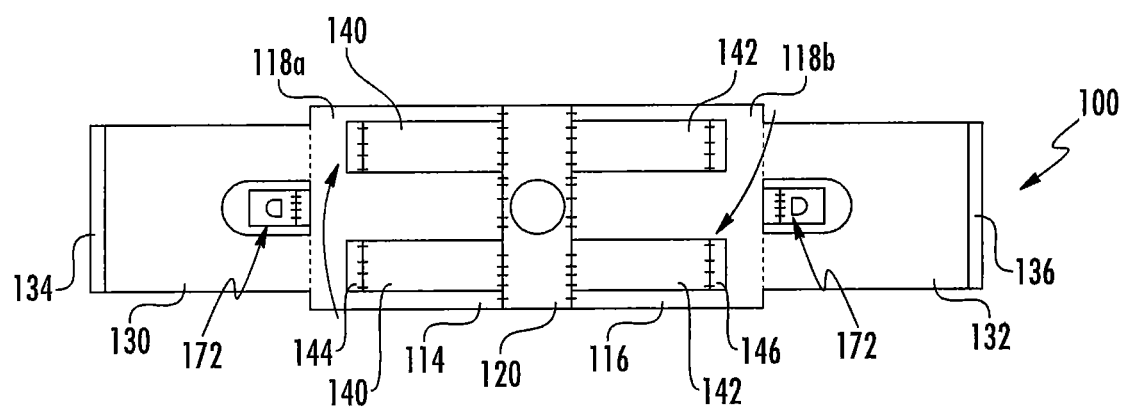
FIG. 4 is a side view of a blank from which the hanger of FIG. 3 can be formed.

Referring now to FIG. 4, a blank 100 suitable for use in manufacturing the cable hanger 110 is shown therein. The blank 100 is generally flat and can be stamped from a sheet of material, such as steel, and bent by known methods into the configuration shown in FIG. 3. The dotted lines shown in FIG. 4 indicate where the blank 100 can be bent to form the cable hanger 110. More specifically, the rear wall 120 is in the center of the blank 100. The side walls 114, 116 extend away from the side edges of the rear wall 120. The rear arms 140, 142, which are formed in two parts each, also extend away from the edges of the rear wall 120 within the area defined by the side walls 114, 116. The front half-walls 118a, 118b extend from the edges of the side walls 114, 116. The front arms 130, 132 extend from the edges of the front half-walls 118a, 118b. The locking projections 172 are formed within the portions of the blank 100 outlined by the front arms 130, 132. The tabs 134, 136 are formed at the lateral ends of the front arms 130, 132, and the hooks 144, 146 are formed at the ends of the rear arms 140, 142. In this configuration, the blank 100 can be bent along the broken lines shown in FIG. 4 into the cable hanger 110, which enables the cable hanger 110 to be formed as a monolithic component.

Figure 5:
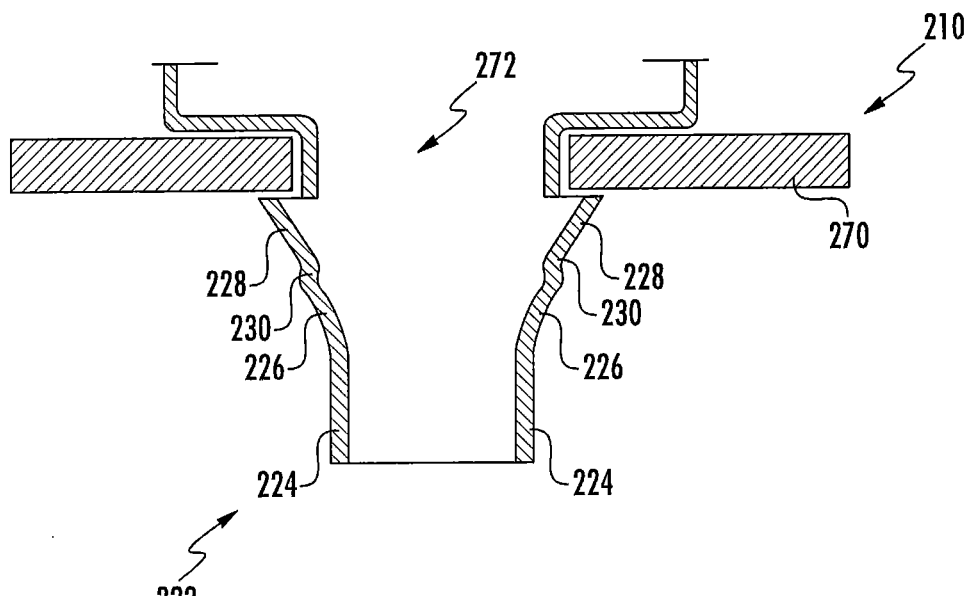
FIG. 5 is an enlarged top view of the locking projections of the cable hanger of FIG. 3.

FIG. 5 illustrates an alternative embodiment of a cable hanger 210 that has locking projections 222 with multi-faced surfaces to facilitate insertion and locking. More specifically, the locking projections 222 have guide surfaces 224 that are generally perpendicular to the front wall 214, ramped surfaces 226 that flare outwardly from the guide surfaces 222, and locking surfaces 228 that flare outwardly from the ramped surfaces 226 (transition bridges 230 are interposed between the ramped surfaces 226 and the locking surfaces 228). The guide surfaces 224 are sized slightly smaller than the mounting hole 272 in the mounting surface 270 to which the cable hanger 210 is to be mounted, thereby guiding the locking projections 222 of the cable hanger 210 into position during mounting. The angled orientations of the ramped and locking surfaces 226, 228 enable the locking projections 222 to slide into the mounting hole 272 when the cable hanger 210 is pressed toward the mounting surface. The edges of the locking surfaces 228 are flared sufficiently outwardly as to be larger than the mounting hole 272, such that the cable hanger 210 is locked into place on the mounting surface 270.

Those skilled in this art will appreciate that the cable hangers 100, 200 may take other forms. The base 112 need not be rectangular, but may take other shapes. The rear arms 140, 142 may be formed as single beams rather than as two beams each. The front arms 130, 132 may be formed as multiple parts. The locking tabs 134, 136 and locking hooks 144, 146 may be reversed, such that the locking hooks extend from the front arms and the locking tabs extend from the rear arms, or these may be replaced with locking features of a different configuration. Further, in some embodiments the locking features may be omitted entirely.

Figure 2:
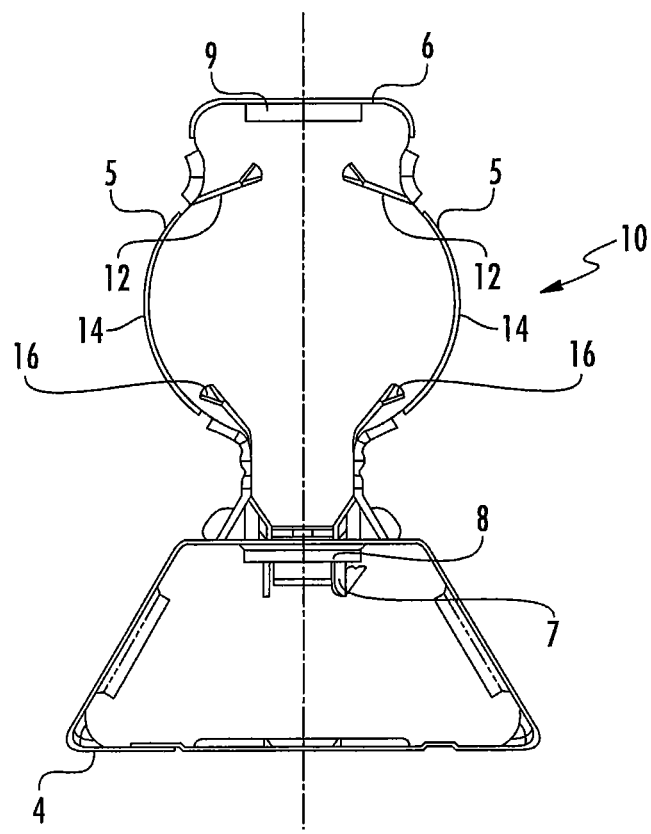
FIG. 2 is a top view of the cable hanger of FIG. 1.

In addition, the front and/or rear arms may include gripping tabs, such as those illustrated at 12 and 16 in the prior cable hanger 10 shown in FIGS. 1 and 2, to facilitate gripping of the cable. Alternative versions of such gripping members are discussed in detail in co-assigned U.S. Provisional Patent Application No. 62/139,057, filed Mar. 27, 2015, and in U.S. patent application Ser. No. 15/081,177, filed Mar. 25, 2016, the disclosure of which is hereby incorporated herein in its entirety. Other variations will be apparent to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger used to mount cables to a mounting structure, comprising:
   a base with a front wall having locking projections and a rear wall having an opening;
   a pair of arcuate front arms mounted to front locations on the base, the front arms extending laterally from opposite sides of the base and having first locking features; and
   a pair of arcuate rear arms mounted to rear locations on the base, the rear arms extending laterally from opposite sides of the base and having second locking features;
   wherein the front and rear arms on one side of the base are mounted such that they are in back-to-back relationship, and wherein the front and rear arms on the opposite side of the base are mounted such that they are in back-to-back relationship;
   wherein the locking projections of the base are configured to be insertable into the opening; and
   wherein the first locking features of the front arms are configured to be interlockable with the second locking features of the rear arms; and
   wherein the cable hanger is a monolithic component formed of a single metallic sheet.

2. The cable hanger defined in claim 1, wherein the first locking features comprise locking tabs, and the second locking features comprise hooks.

3. A method of mounting two communications cables to a mounting structure, comprising the steps of:
   (a) providing first and second cable hangers, each of the first and second cable hangers comprising:
      a base with a front wall having locking projections and a rear wall having an opening;
      a pair of arcuate front arms mounted to front locations on the base, the front arms extending laterally from opposite sides of the base and having first locking features; and
      a pair of arcuate rear arms mounted to rear locations on the base, the rear arms extending laterally from opposite sides of the base and having second locking features;
      wherein the front and rear arms on one side of the base are mounted such that they are in back-to-back relationship, and wherein the front and rear arms on the opposite side of the base are mounted such that they are in back-to-back relationship;
      wherein the locking projections of the base are configured to be insertable into the opening; and
      wherein the first locking features of the front arms are configured to be interlockable with the second locking features of the rear arms; and
      wherein each of the first and second cable hangers is a monolithic component formed of a single metallic sheet;
   (b) inserting the locking projections of the first cable hanger into mounting holes of a mounting structure;
   (c) positioning first and second cables adjacent the rear arms of the first cable hanger;
   (d) inserting the locking projections of the second cable hanger into the hole of the base of the first cable hanger and through the rear wall of the first cable hanger to capture the first and second cables.

4. The method defined in claim 3, wherein the first locking features comprise locking tabs, and the second locking features comprise hooks.

* * * * *